United States Patent
Kjellson (10) Patent No.: US 12,487,350 B2
(45) Date of Patent: Dec. 2, 2025

(54) RADAR AIDED VIDEO TRACKING

(71) Applicant: Axis AB, Lund (SE)

(72) Inventor: Christoffer Kjellson, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 18/967,688

(22) Filed: Dec. 4, 2024

(65) Prior Publication Data
US 2025/0189659 A1 Jun. 12, 2025

(30) Foreign Application Priority Data

Dec. 8, 2023 (EP) .................................. 23215141

(51) Int. Cl.
*G01S 13/86* (2006.01)
*G01S 13/72* (2006.01)
*G06V 20/40* (2022.01)

(52) U.S. Cl.
CPC .......... *G01S 13/867* (2013.01); *G01S 13/723* (2013.01); *G06V 20/41* (2022.01)

(58) Field of Classification Search
None
See application file for complete search history.

(56) References Cited

U.S. PATENT DOCUMENTS

| | | | |
|---|---|---|---|
| 7,783,427 B1 | 8/2010 | Woodell et al. | |
| 7,940,206 B2 | 5/2011 | Nohara et al. | |
| 11,625,909 B1 * | 4/2023 | Zhou | G06V 10/26 382/103 |
| 12,013,919 B2 * | 6/2024 | Zhu | G01S 13/931 |
| 12,050,273 B2 * | 7/2024 | Saranin | G06T 7/162 |
| 12,118,732 B2 * | 10/2024 | Wyffels | G06T 7/246 |
| 12,361,677 B2 * | 7/2025 | Keefe | G06V 10/25 |

(Continued)

FOREIGN PATENT DOCUMENTS

| | | |
|---|---|---|
| CN | 115184917 A | 10/2022 |
| CN | 116229728 A | 6/2023 |

(Continued)

OTHER PUBLICATIONS

Communication under Rule 71(3) EPC dated Jun. 27, 2025 in corresponding European Application No. EP23215141.5 (7 pages).

(Continued)

*Primary Examiner* — Bernarr E Gregory
(74) *Attorney, Agent, or Firm* — XSENSUS LLP (57) ABSTRACT

Video tracks include positions and a classification relative to respective objects detected in a sequence of video image frames captured of a scene during a time period and the radar track includes positions and classification in relation to of an object detected in radar data captured for at least a part of the scene during the time period. An indication is obtained for each video track of the video tracks whether the radar track and the video track of the video tracks correspond based on a similarity according to a similarity measure. A second video track is ignored or deleted on condition that the radar track and a first video track correspond, the classifications associated with the radar track and the first video track correspond, the radar track and the second video track correspond, and the classifications associated with the radar track and the second video track do not correspond.

11 Claims, 3 Drawing Sheets

(56) References Cited

U.S. PATENT DOCUMENTS

| | | | |
|---|---|---|---|
| 2006/0238406 A1 | 10/2006 | Nohara et al. | |
| 2021/0263525 A1* | 8/2021 | Das | G06N 3/084 |
| 2022/0324437 A1 | 10/2022 | Blau et al. | |
| 2023/0008015 A1 | 1/2023 | Bodnariuc et al. | |
| 2023/0115115 A1* | 4/2023 | Ogawa | G06V 20/58 |
| | | | 382/104 |
| 2023/0215184 A1* | 7/2023 | Fay | G06V 20/58 |
| 2023/0360379 A1 | 11/2023 | Zhou et al. | |

FOREIGN PATENT DOCUMENTS

| | | | |
|---|---|---|---|
| CN | 117008117 A | 11/2023 | |
| WO | 2021223368 A1 | 11/2021 | |
| WO | 2023067385 A2 | 4/2023 | |

OTHER PUBLICATIONS

Communication pursuant to Article 94(3) EPC dated Aug. 28, 2024 in corresponding European Application No. EP23215141.5 (6 pages).
Communication pursuant to Article 94(3) EPC dated Dec. 12, 2024 in corresponding European Application No. EP23215141.5 (4 pages).
Extended European Search Report mailed on May 16, 2024, received for EP Application 23215141.5, 15 pages.

\* cited by examiner

RADAR AIDED VIDEO TRACKING

CROSS-REFERENCE TO RELATED APPLICATION

This application claims priority to European Patent Application No. 23215141.5, filed on Dec. 8, 2023, the entire disclosure of which is incorporated by reference herein.

TECHNICAL FIELD

The present invention relates to tracking in video, and specifically to identifying redundant video tracks in a sequence of video image frames.

BACKGROUND

A moving object in a sequence of video image frames captured of a scene may be tracked and classified resulting in a video track comprising a classification of the moving object and a position of the moving object in each video image frame of the sequence of video image frames. Such video tracks may then be used in a number of applications. When performing video tracking and classification, some objects that are related to other objects may be detected and tracked. An example of this is when a person driving a truck is tracked, in addition to the truck itself being tracked. In other words, the video tracking may result in one track for a main object of interest, e.g. a truck, and an additional track for a related object, e.g. a person driving the truck, that is related to the main object. It is desirable to identify such related objects such that the video tracks of the related objects may be determined as redundant.

SUMMARY OF THE INVENTION

An object of the present invention is to overcome or at least mitigate the problems and drawbacks of prior art.

According to a first aspect, a method is provided for identifying redundant video tracks. The method comprises obtaining video tracks. The video tracks comprise positions and a classification in relation to respective objects detected in a sequence of video image frames captured of a scene during a time period. The method further comprises obtaining a radar track. The radar track comprises positions and a classification in relation to an object detected in radar data captured for at least a part of the scene during the time period. The method further comprises obtaining an indication for each video track of the video tracks whether the radar track and the video track of the video tracks correspond. The radar track and the video track of the video tracks correspond on condition that a similarity between the radar track and the video track of the video tracks according to a similarity measure is above a threshold. The method further comprises identifying a second video track of the video tracks as redundant on condition that:

1) the radar track and a first video track of the video tracks correspond, and the classification associated with the radar track corresponds to the classification associated with the first video track of the video tracks; and
2) the radar track and the second video track of the video tracks correspond, and the classification associated with the radar track does not correspond to the classification associated with the second video track of the video tracks.

The invention makes use of the realization that a camera capturing video image frames of objects close to each other and moving at the same speed, may well be detected by a video object detector and classified as separate objects, e.g. a truck and its driver, such that separate video tracks are created for the objects. Radar monitoring the same scene on the other hand, would typically only create a single radar track, especially if the truck driver sits inside the truck.

By the radar track corresponding both to the first video track and to the second video track and the classification associated with the radar track corresponding to the classification associated with the first video track but not corresponding to the classification associated with the second video track, objects that are related can be identified where the radar only detects one of the objects. Specifically, the radar track corresponding to the first video track and the classification associated with the radar track corresponding to the classification associated with the first video track, indicate that it is the same object that is tracked in the first video track as in the radar track. Furthermore, the radar track corresponding also to the second video track indicates that the second video track is of an object that is the same or related to the object of the first video track since the radar track corresponds also to the first video track. However, since the classification associated with the radar track does not correspond to the classification associated with the second video track, it can be determined that the second video track is of an object that is not the same as the object of the first video track. Hence, it can be determined that the second video track is of an object that is related to the object of the first video track and the second video track is determined as redundant.

By 'video track' is meant a track of an object in a video including a sequence of video image frames.

By 'the video tracks comprise positions in relation to respective objects detected in a sequence of video image frames' is meant that each video track comprises a respective position in each video image frame in relation to a respective object detected in the sequence of video image frames.

By 'the video tracks comprise a classification in relation to respective objects detected in a sequence of video image frames" is meant that each video track comprises a classification in relation to a respective objected detected in the sequence of video image frames.

By 'an object of a radar track' is meant the object that is tracked in the radar track and by 'an object of a video track' is meant the object that is tracked in the video track.

The method may further comprise obtaining further radar tracks. The further radar tracks comprise positions and a classification in relation to respective further objects detected in the radar data captured for at least a part of the scene during the time period. The method may then further comprise obtaining an indication for each of the further radar tracks whether the second video track of the video track and the radar track of the further radar tracks correspond. The second video track of the of the video tracks and the radar track of the further radar tracks correspond on condition that a similarity between the second video track of the video tracks and the radar track of the further radar tracks according to a similarity measure is above a threshold. The second video track of the video tracks is identified as redundant on the further condition that the second video track of the video tracks and no one of the further radar tracks correspond.

By obtaining further radar tracks and ensuring that none of the further radar tracks corresponds to the second video track it is determined with further certainty that the second video track is redundant.

The method may further comprise obtaining an indication for each of the further radar tracks whether a third video track of the video track s and the radar track of the further radar tracks correspond. The third video track of the video tracks and the radar track of the further radar tracks correspond on condition that a similarity between the third video track of the video tracks and the radar track of the further radar tracks according to a similarity measure is above a threshold. The method may then further comprise identifying the third video track of the video tracks as not redundant on condition that the third video track of the video tracks and no one of the radar track and the further radar tracks correspond.

If the video track does not correspond to any radar track. It cannot be determined that the third video track is redundant. Hence, it is determined that the third video track is not redundant.

The similarity measure may be based on a similarity between positions of an object of a radar track and positions of an object of a video track.

The video tracks may further comprise speeds in relation to the respective objects detected in the sequence of video image frames, and the radar track further comprises speeds in relation to the object detected in the radar data. The similarity measure may then be based on a similarity between positions and speeds of a radar track and positions and speeds of a video track.

According to a second aspect, a non-transitory computer readable storage medium is provided having stored thereon instructions which, when executed in a device having processing capabilities, causes the device to perform the method according to the first aspect.

The above-mentioned optional additional features of the method according to the first aspect, when applicable, apply to the non-transitory computer readable storage medium according to the second aspect as well. In order to avoid undue repetition, reference is made to the above.

According to a third aspect, a device is provided for identifying redundant video tracks. The device comprises circuitry configured to execute a first obtaining function, a second obtaining function, a third obtaining function, and an identifying function. The first obtaining function is configured to obtain video tracks. The video tracks comprises positions and a classification in relation to respective objects detected in a sequence of video image frames captured of a scene during a time period. The second obtaining function is configured to obtain a radar track. The radar track comprises positions and a classification in relation to an object detected in radar data captured for at least a part of the scene during the time period. The third obtaining function is configured to obtain an indication for each video track of the video tracks whether the radar track and the video track of the video tracks correspond. The radar track and the video track of the video tracks correspond on condition that a similarity between the radar track and the video track of the video tracks according to a similarity measure is above a threshold. The identifying function is configured to identify a second video track of the video tracks as redundant on condition that:

1) the radar track and a first video track of the video tracks correspond, and the classification associated with the radar track corresponds to the classification associated with the first video track of the video tracks; and
2) the radar track and the second video track of the video tracks correspond, and the classification associated with the radar track does not correspond to the second video track of the video tracks.

The above-mentioned optional additional features of the method according to the first aspect, when applicable, apply to the device according to the third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above and other aspects of the present invention will now be described in more detail, with reference to appended figures. The figures should not be considered limiting but are instead used for explaining and understanding.

DETAILED DESCRIPTION

The present invention will now be described with reference to the accompanying drawings, in which currently preferred embodiments of the invention are illustrated. This invention may, however, be embodied in many different forms and should not be construed as limited to the embodiments set forth herein.

Embodiments of the present invention are applicable for example in scenarios where video tracking results in one video track for an object of interest or main object, and one or more additional tracks for one or more additional objects referred to as related objects. These related objects may be objects related to the object of interest, and due to the specific application, such as a surveillance scenario, related objects should not or need not be considered and video tracks relating to related objects should be identified as redundant tracks so that they may be ignored and/or deleted.

Examples of scenarios where there are related objects where video tracks relating to the related objects should be identified as redundant, so that they may be ignored and/or deleted are given below.

A scenario where 'truck' is a class being an object of interest where an object of the class 'person' coming dangerously close to an object of the class 'truck' should result in an alarm to be issued. In such a scenario an alarm does not need to be issued if the object of the class "person" is the driver of the truck. Hence, any video tracks that tracks the driver should be identified as redundant.

A scenario where 'truck' is a class being an object of interest where an object of the class 'bicycle' coming dangerously close to an object of the class 'truck' should result in an alarm to be issued. In such a scenario an alarm does not need to be issued if the object of the class 'bike' is a bike transported by the object of the class "truck". Hence, any video track that tracks a bike that is being transported by the truck should be identified as redundant.

A scenario where 'person' is a class being an object of interest in relation to an object of the class 'dog' when the person is walking the dog, but in which stray dogs should cause an alarm. In such a scenario, an alarm does not need to be issued if the object of the class 'dog' is a dog being walked by a person. Hence, any video track that tracks a dog that is being walked by a person should be identified as redundant.

A scenario where 'person' is a class being an object of interest in relation to an object of the class 'bag' when the person is carrying or standing close to the bag, but in which a bag which is not carried by a person should cause an alarm. In such a scenario, an alarm does not need to be issued if the object of the class 'bag' is a bag being carried by a person. Hence, any video track that tracks a bag that is being carried by a person should be identified as redundant.

Embodiments of a method 100 for identifying redundant video tracks will now be described in relation to the flow charts in FIGS. 1a and 1b.

Figure 1A:
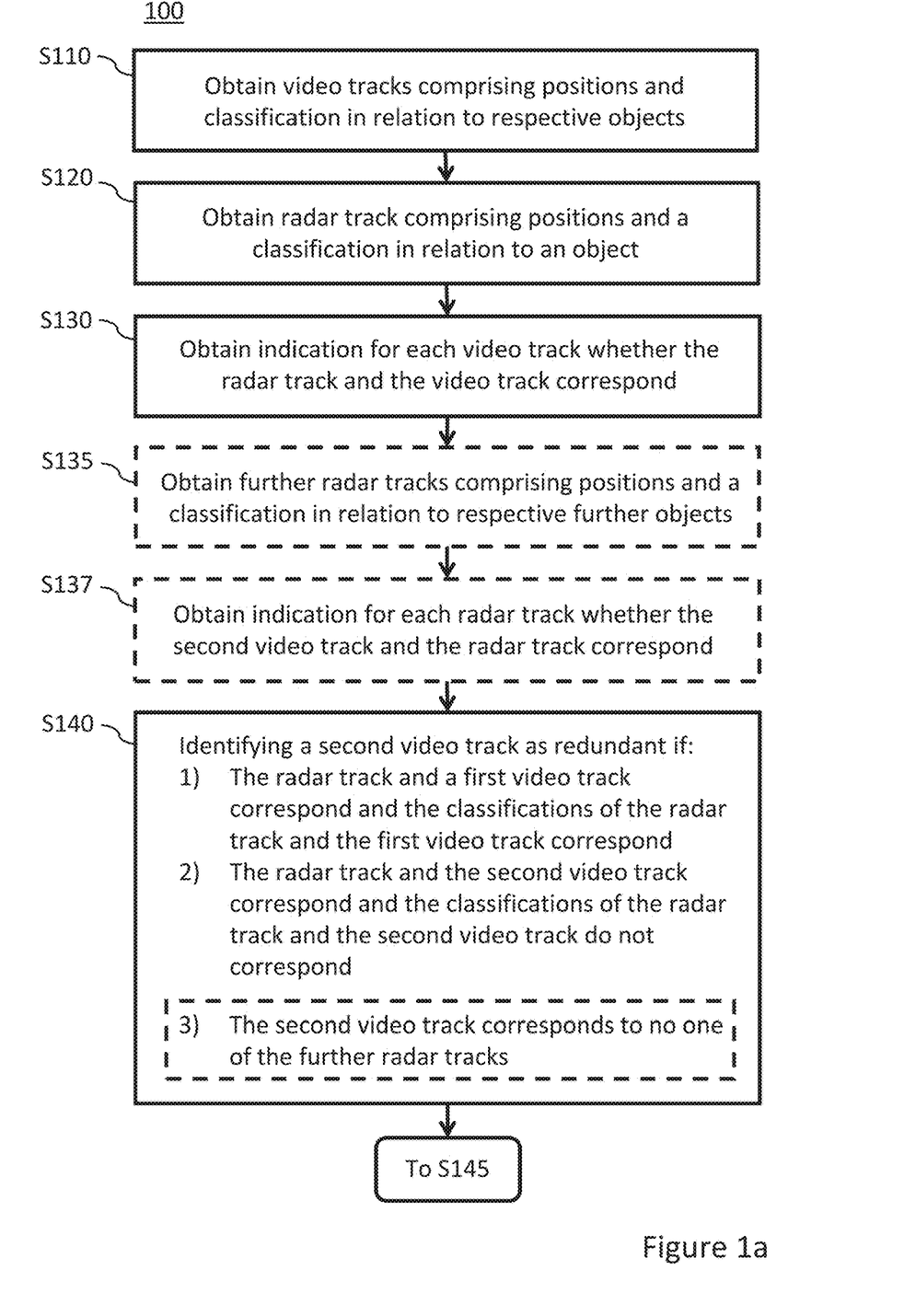
FIGS. 1a and 1b show flow charts in relation to embodiments of a method for identifying redundant video tracks.

Turning to FIG. 1a, the method 100 video tracks are obtained S110. The video tracks comprise positions and a classification in relation to respective objects detected in a sequence of video image frames captured of a scene during a time period. The video tracks may be created using any computer implemented object tracking method in the sequence of video image frames for which each video track comprises a respective position for the object relating to the video track in each of the sequence of video image frames and a classification of the object relating to the video track. Specifically, each video track of the video track tracks a respective object detected in the sequence of video image frames. Furthermore, each video track then comprises a position in each video image frame of the sequence of video image frames of the object of the video track. Each video track further comprises a classification of the object of the video track.

The method 100 further comprises obtaining S120 a radar track. The radar track comprises positions and a classification in relation to an object detected in radar data captured for at least a part of the scene during the time period. The radar track may have been created using any computer implemented object tracking method in radar data captured for at least a part of the scene during the same time period as the sequence of video image frames were captured for which the radar track comprises positions for the object corresponding to the radar track during the time period and a classification of the object corresponding to the radar track.

The method 100 further comprises obtaining S130 an indication for each video track of the video tracks whether the radar track and the video track of the video tracks correspond. The radar track and the video track are determined to correspond on condition that a similarity between the radar track and the video track of the video tracks according to a similarity measure is above a threshold. Any similarity measure can be used for which a threshold can be set such that identification that the radar track and the video track correspond based on the threshold will likely mean that the object of the video track is either the same object as or a related object to the object of the radar track. The similarity measure indicates how similar the radar track and the video track are and may for example be based on a similarity between positions of the object of the radar track during the time period and positions of the object of the video track in the sequence of video image frames captured during the time period. The similarity measure further typically indicates how close the radar track and the video track are. Similarity between positions may thus be determined based on distance between positions comprised in the radar track and in the video track based on a distance measure. Such a distance measure may for example be $L_2$ norm. Uncertainty of the positions may also be taken into account, e.g. by means of a Mahalanobis distance as the distance measure (see e.g. https://en.wikipedia.org/wiki/Mahalanobis_distance.

When comparing the radar track and a video track, the radar detections may be transformed to the coordinate system of the camera capturing the sequence of video image frames. Depending on the type of radar, a model of the vertical distance from the radar to a radar detection may first be used to determine a complete 3D position and optionally 3D velocity. A model of the vertical distance from the radar to the radar detection may for instance be created using knowledge of tilt and installation height of the radar. Transformation then requires knowledge of the intrinsic and extrinsic parameters of the camera and of the relative relationship (rotation and position) between the radar and the camera, for instance a model for projection of a pinhole camera (see e.g. https://en.wikipedia.org/wiki/Pinhole_camera) may be used.

In case of a 2D radar each detection in a radar track has a radial distance and azimuth, and optionally also radial velocity and angular (azimuth) velocity, but elevation angle is not known. A model of the vertical distance from the radar to the radar detection may be used to determine an estimated elevation angle and thus the vertical position, and optionally elevation angle velocity, for a radar detection in the coordinate system of the camera if all detections are assumed to be located on the ground.

In case of a 3D radar where, in addition to radial distance and azimuth, the elevation angle is also included in the radar detection. The elevation angle is used to determine the vertical distance from the radar to a radar detection and can be transformed into a vertical position for a radar detection in the coordinate system of the camera. Optionally, also elevation angle velocity is included. Thus a 3D position may be determined and optionally a 3D velocity, which are then transformed to the coordinate system of the camera, again with help from a model for projection, before comparing the radar track and a video track.

Using the same assumption that all detections are located on the ground, camera detections may be provided with an estimated depth in the scene measured from the camera based on the pinhole camera model and the model of the vertical distance from the radar to the radar detection.

The radar detections and camera detections are then matched in the coordinate system of the camera by means of the time the detections were made together with the position and optionally also the velocity given in the coordinate system of the camera.

A statistical measure of the distance, such as Mahalanobis distance, between the detections' positions and velocities are used together with a chosen distance threshold to determine which detections match.

It is to be noted that the comparison of the radar track and a video track may be made in any common coordinate system, e.g. in the coordinate system of the camera image, the coordinate system of the radar information, the real world coordinate system, or any other coordinate system specified for the tracking system.

By obtaining S130 an indication for each video track of the video tracks whether the radar track and the video track of the video tracks correspond, it can be determined whether the radar track corresponds to two different video tracks, i.e. a first video track and a second video track. This means that the radar track, tracks an object that has similar positions over the period of time as both the positions of the object tracked by the first video track in the sequence of video image frames captured during the period of time and the positions of the object tracked by the second video track in the sequence of video image frames captured during the period of time. This indicates that the object of the second video track may be a related object to the object of the first video track, and that the object of the radar track is the same as either the object of the first video track or the object of the second video track.

If the classification associated with the radar track is determined to corresponds to the classification associated with the first video track and that the classification associated with the radar track is determined not correspond to the classification associated with the second video track of the video tracks, this indicates that the object of the second video track is a related object to the object of the first video track and that the second video track can be identified as redundant.

Consequently, the method 100 further comprises identifying S140 the second video track of the video tracks as redundant on condition that:
1) the radar track and the first video track of the video tracks correspond, and the classification associated with the radar track corresponds to the classification associated with the first video track of the video tracks; and
2) the radar track and the second video track of the video tracks correspond, and the classification associated with the radar track does not correspond to the classification associated with the second video track of the video tracks.

When the second video track of the video tracks is identified S140 as redundant, it may be provided with a tag identifying the second video track as redundant. A subsequent application receiving the video tracks may then identify the tag indicating the second video track as redundant. The subsequent application may the filter out or delete the second video track such that it is not disclosed or otherwise used.

Determining correspondence between classifications of the radar track and the video track may depend on the classification systems and different classes used in relation to the two types of tracks. For example, the classification in relation to video tracks may be more detailed such that there are more classes than classification in relation to radar tracks, e.g. such that many different classes in relation to video tracks are classified as a common class in relation to radar tracks. As an example, classification of vehicles in relation to video tracks may include classes car, truck, bus, tractor etc. whereas all these vehicles are classified in the class vehicle in relation to radar tracks. The opposite may also be the case that the classification in relation to radar tracks may be more detailed such that there are more classes than classification in relation to video tracks. In embodiments, the classification associated with the radar track is said to correspond to the classification associated with the first video track if the classification associated with the radar track is the same, is a subclass of, or is a superclass of the classification associated with the first video track. For example, the classification 'vehicle' associated with the radar track then corresponds to classification 'truck' associated with the video track since vehicle is a superclass in relation to truck.

In embodiments, the video tracks further comprise speeds in relation to the respective objects detected in the sequence of video image frames captured during the period of time, and the radar track further comprises speeds in relation to the object detected in the radar data during the period of time. Specifically, each video track then comprises a velocity of the object of the video track in each video image frame of the sequence of video image frames captured during the period of time and the radar track then comprises velocities of the object of the radar track during the time period. In such embodiments, the similarity measure may be further based on a similarity between positions and speeds of a radar track and positions and speeds of a video track optionally taking uncertainty into account.

Other parameters that may also be used in relation to similarity are acceleration and historical data för in relation to movement pattern.

Reference is now made to the scenario identified hereinabove where 'truck' is the class being an object of interest and where an object of the class 'person' coming dangerously close to an object of the class 'truck' should result in an alarm to be issued, but where an alarm does not need to be issued if the object of the class 'person' is the driver of the truck. In such a scenario, the first video track tracks the truck and the second video track tracks the driver. Furthermore, the radar track tracks the truck but since the driver being located inside the truck when driving is not detected separately in the radar data. Since the truck and the driver will have the same or similar positions and speed in the first video track, in the second video track, and in the radar track, the radar track will correspond to both the first video track and the second video track. Depending on the classes defined for objects of radar tracks and video tracks, the object of the radar track may e.g. have a class 'truck' or 'vehicle' and the object of the first video track may e.g. have a class 'truck' or 'vehicle'. Hence, the classes of the objects of the radar track and the first video track will either be the same, a subclass, or a superclass in relation to each other and thus correspond. The object of the second video track may e.g. have a class 'person'. Hence, the classes of the objects of the radar track and the second video track will neither be the same, a subclass, or a superclass in relation to each other and thus not correspond. Hence, both the conditions for identifying the second video track as redundant are fulfilled.

Reference is now made to the scenario identified hereinabove where 'truck' is the class being an object of interest and where an object of the class 'bicycle' coming dangerously close to an object of the class 'truck' should result in an alarm to be issued, but where an alarm does not need to be issued if the object of the class 'bicycle' is transported by the truck. In such a scenario, the first video track tracks the truck and the second video track tracks the bicycle. Furthermore, the radar track tracks the truck but since the bicycle is located on the truck when transported it may not be detected separately in the radar data. Since the truck and the bicycle will have the same or similar positions and speed in the first video track, in the second video track, and in the radar track, the radar track will correspond to both the first video track and the second video track. Depending on the classes defined for objects of radar tracks and video tracks, the object of the radar track may e.g. have a class 'truck' and the object of the first video track may e.g. have a class 'truck'. Hence, the classes of the objects of the radar track and the first video track will be the same. The object of the second video track may e.g. have a class 'bicycle'. Hence, the classes of the objects of the radar track and second first video track will neither be the same, a subclass, or a superclass in relation to each other and thus not correspond. Hence, both the conditions for identifying the second video track as redundant are fulfilled. It is to be noted that this embodiment requires that classification in relation to the radar track relating to the truck can be made to the class 'truck' and not just the class 'vehicle' since then both the class 'truck' of the first video track and the class 'bike' of the second video track would correspond to the class 'vehicle' of the radar track. In alternative, in embodiments, correspondence is only determined if the classes are the same.

Reference is now made to the scenario identified hereinabove where 'person' is a class being an object of interest in relation to an object of the class 'dog' when the person is walking the dog, but in which stray dogs should cause an alarm. In such a scenario, the first video track tracks the person and the second video track tracks the dog which is walked by the person. Furthermore, the radar track tracks the person but since the dog is being close to the person when the person is walking the dog, the dog is not detected separately in the radar data. Since the person and the dog will have the same or similar positions and speed in the first video track, in the second video track, and in the radar track, the radar track will correspond to both the first video track and the second video track. Depending on the classes defined for objects of radar tracks and video tracks, the object of the radar track may e.g. have a class 'person' and the object of the first video track may e.g. have a class 'person'. Hence, the classes of the objects of the radar track and the first video track will be the same and thus correspond. The object of the second video track may e.g. have a class 'dog'. Hence, the classes of the objects of the radar track and the second video track will neither be the same, a subclass, or a superclass in relation to each other and thus not correspond. Hence, both the conditions for identifying the second video track as redundant are fulfilled.

Reference is now made to the scenario identified hereinabove where 'person' is a class being an object of interest in relation to an object of the class 'bag' when the person is carrying or standing close to the bag, but in which a bag which is not carried by a person should cause an alarm. In such a scenario, the first video track tracks the person and the second video track tracks the bag which is carried by the person. Furthermore, the radar track tracks the person but since the bag is being carried by the person, the bag is not detected separately in the radar data. Since the person and the bag will have the same or similar positions and speed in the first video track, in the second video track, and in the radar track, the radar track will correspond to both the first video track and the second video track. Depending on the classes defined for objects of radar tracks and video tracks, the object of the radar track may e.g. have a class 'person' and the object of the first video track may e.g. have a class 'person'. Hence, the classes of the objects of the radar track and the first video track will be the same and thus correspond. The object of the second video track may e.g. have a class 'bag'. Hence, the classes of the objects of the radar track and the second video track will neither be the same, a subclass, or a superclass in relation to each other and thus not correspond. Hence, both the conditions for identifying the second video track as redundant are fulfilled.

The method 100 may further comprise obtaining S135 further radar tracks. Each radar track of the further radar tracks comprises a classification in relation to a further object detected in the radar data captured for at least a part of the scene during the time period and positions of the further object. Preferably, the further radar tracks include radar tracks for all further objects detected in the radar data captured for at least a part of the scene during the time period.

The method 100 then further comprises obtaining S137 an indication for each of the further radar tracks whether the second video track of the video track and the radar track of the further radar tracks correspond. The second video track of the video tracks and the radar track of the further radar tracks correspond on condition that a similarity between the second video track of the video tracks and the radar track of the further radar tracks according to a similarity measure is above a threshold. The same similarity measure and threshold is preferably used as for determining whether the radar track and each video track of the video tracks correspond.

A further condition for identifying S140 the second video track of the video tracks as redundant may then added namely that:

3) the second video track of the video tracks and no one of the further radar tracks correspond.

By determining that the second video track of the video tracks and no one of the further radar tracks correspond, it can be determined with further certainty that the second video track is redundant. For example, if the second video track were to track an object that is unrelated, i.e. not related, to the object of the first video track but is an object that is located at a distance in depth from the object of the first video track, e.g. in front of or behind the object of the first video track, this may still result in the first video track and the second video track being similar and that they both correspond to the radar track. This is because there is no depth information from the video camera capturing the sequence of video image frames. However, as the radar data includes also depth information one of the further radar tracks may track the same object as the second video track. This radar track of the further radar tracks would then likely also correspond to the second video track. Hence, if no one of the further radar tracks corresponds to the second video track, it may be determined that the second video track does not track an object that is unrelated to the object of the first video track, i.e. that the second track does not track an object that is located at a distance in depth from the object of the first video track, e.g. in front of or behind the object of the first video track. Consequently, including the condition that the second video track of the video tracks and no one of the further radar tracks correspond for the second video track being identified S140 as redundant will reduce the likelihood of erroneous identification.

Figure 1B:
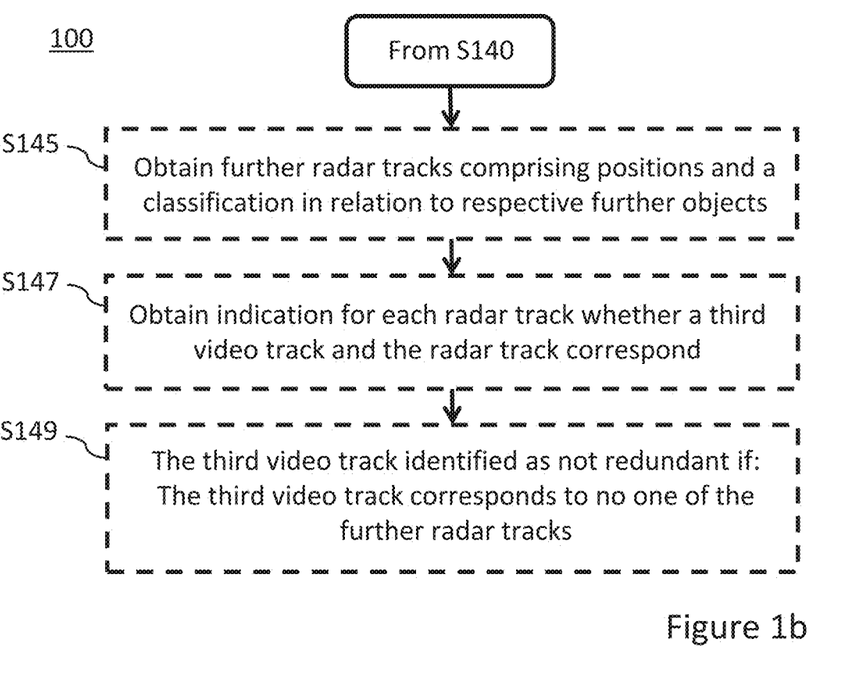

Turning to FIG. 1b, the method 100 may further comprise obtaining S145 further radar tracks. Each radar track of the further radar tracks comprises a classification in relation to a further object detected in the radar data captured for at least a part of the scene during the time period and positions of the further object. Preferably, the further radar tracks include radar tracks for all further objects detected in the radar data captured for at least a part of the scene during the time period.

The method 100 then further comprises obtaining S147 an indication for each of the further radar tracks whether a third video track of the video tracks and the radar track of the further radar tracks correspond. The third video track of the video tracks and the radar track of the further radar tracks correspond on condition that a similarity between the third video track of the video tracks and the radar track of the further radar tracks according to a similarity measure is above a threshold. The same similarity measure and threshold is preferably used as for determining whether the radar track and each video track of the video tracks correspond in relation to obtaining S130 indication for each video track whether the radar track and the video track correspond.

The third video track of the video tracks is then identified S149 as not redundant on condition that the third one of the video tracks and no one of the radar track and the further radar tracks correspond.

The method 100 is based on using correspondence with one or more radar tracks to enable identification of redundant video tracks. Hence, if the third video track does not correspond to any radar track, the method does not provide any information that indicates that the third video track is redundant. Thus, in order to avoid erroneous identification of redundancy, it is determined that the third video track is not redundant.

In alternative to explicitly identifying video tracks as not redundant, it may be considered sufficient to implicitly identify video tracks as not redundant by the video tracks not being explicitly identified as redundant.

Figure 2:
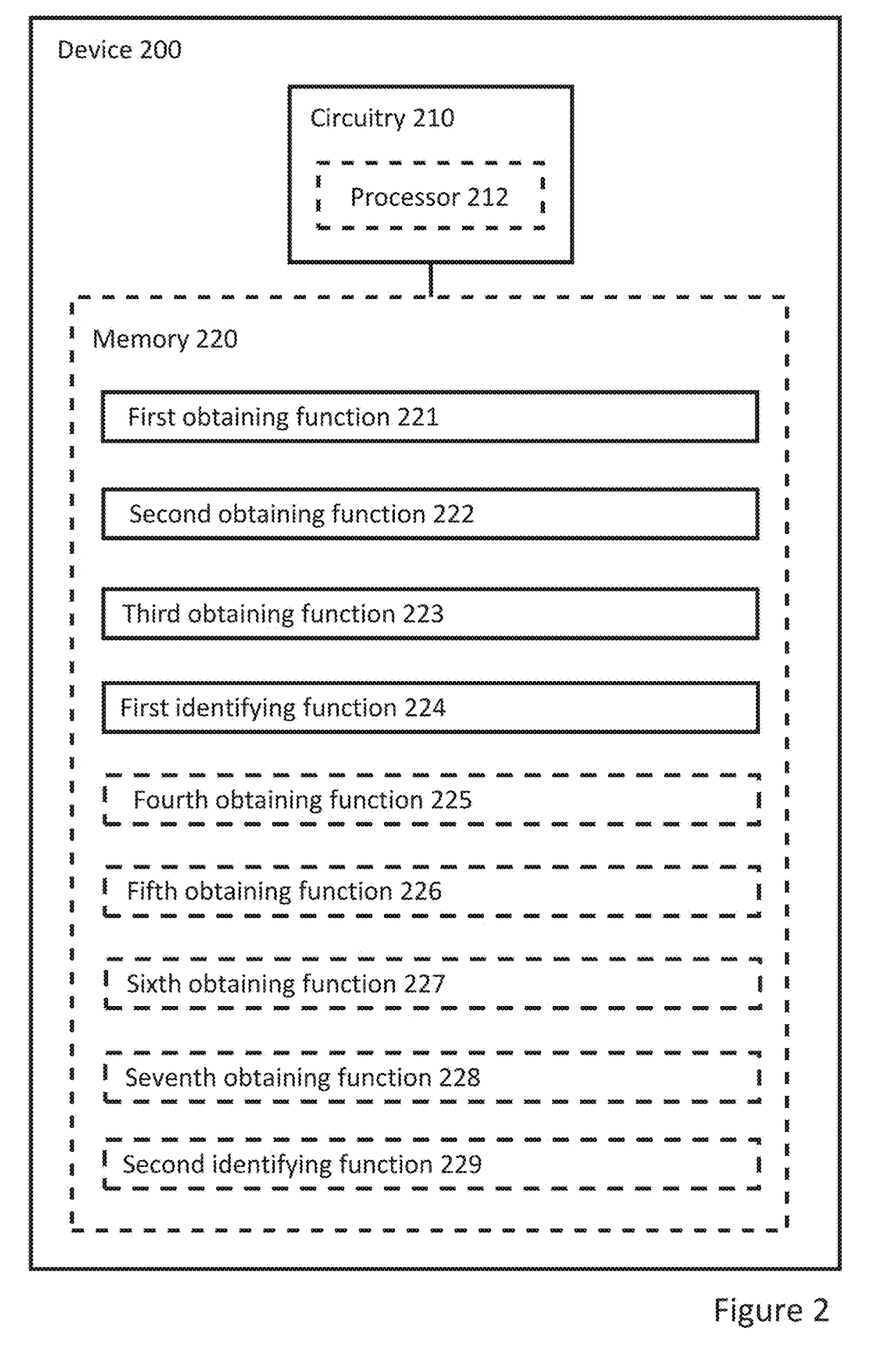
FIG. 2 shows a schematic diagram in relation to embodiments of a device for identifying redundant video tracks.

FIG. 2 shows a block diagram in relation to embodiments of an image processing device for generating an output image with masking of objects of classes to be masked. The image processing device 200 may for example be a camera, be included in a camera or be connected to a camera for capturing the image.

The image processing device 200 comprises circuitry 210. The circuitry 210 is configured to carry out functions of the image processing device 200. The circuitry 210 may include a processor 212, such as for example a central processing unit (CPU), graphical processing unit (GPU), tensor processing unit (TPU), microcontroller, or microprocessor. The processor 212 is configured to execute program code. The program code may for example be configured to carry out the functions of the image processing device 200.

The image processing device 200 may further comprise a memory 220. The memory 220 may be one or more of a buffer, a flash memory, a hard drive, a removable media, a volatile memory, a non-volatile memory, a random access memory (RAM), or another suitable device. In a typical arrangement, the memory 220 may include a non-volatile memory for long term data storage and a volatile memory that functions as device memory for the circuitry 210. The memory 220 may exchange data with the circuitry 210 over a data bus. Accompanying control lines and an address bus between the memory 220 and the circuitry 210 also may be present.

Functions of the image processing device 200 may be embodied in the form of executable logic routines (e.g., lines of code, software programs, etc.) that are stored on a non-transitory computer readable medium (e.g., the memory 220) of the image processing device 200 and are executed by the circuitry 210 (e.g., using the processor 212). Furthermore, the functions of the sending device 200 may be a stand-alone software application or form a part of a software application that carries out additional tasks related to the image processing device 200. The described functions may be considered a method that a processing unit, e.g., the processor 212 of the circuitry 210 is configured to carry out. Also, while the described functions may be implemented in software, such functionality may as well be carried out via dedicated hardware or firmware, or some combination of hardware, firmware and/or software.

The circuitry 210 is configured to execute a first obtaining function, a second obtaining function, a third obtaining function, and an identifying function, and optionally a fourth obtaining function, a fifth obtaining function, a sixth obtaining function, a seventh obtaining function, and a second identifying function.

The first obtaining function 221 is configured to obtain video tracks. The video tracks comprise positions and a classification in relation to respective objects detected in a sequence of video image frames captured of a scene during a time period.

The second obtaining function 222 is configured to obtain a radar track. The radar track comprises positions and a classification in relation to an object detected in radar data captured for at least a part of the scene during the time period.

The third obtaining function 223 is configured to obtain an indication for each video track of the video tracks whether the radar track and the video track of the video tracks correspond. The radar track and the video track of the video tracks correspond on condition that a similarity between the radar track and the video track of the video tracks according to a similarity measure is above a threshold.

The first identifying function 224 is then configured to identify a second video track of the video tracks as redundant on condition that:
1) the radar track and a first video track of the video tracks correspond, and the classification associated with the radar track corresponds to the classification associated with the first video track of the video tracks; and
2) the radar track and the second video track of the video tracks correspond, and the classification associated with the radar track does not correspond to the second video track of the video tracks.

The fourth obtaining function 225 is configured to obtain further radar tracks, wherein the further radar tracks comprise positions and a classification in relation to respective further objects detected in the radar data.

The fifth obtaining function 226 is then configured to obtain an indication for each of the further radar tracks whether the second video track of the video track and the radar track of the further radar tracks correspond. The second video track of the video tracks and the radar track of the further radar tracks correspond on condition that a similarity between the second video track of the video tracks and the radar track of the further radar tracks according to a similarity measure is above a threshold.

In the first identifying function 224, the second video track of the video tracks is then identified as redundant on the further condition that:
3) the second video track of the video tracks and no one of the further radar tracks correspond.

The sixth obtaining function 227 is configured to obtain further radar tracks. The further radar tracks comprise positions and a classification in relation to respective further objects detected in the radar data.

The seventh obtaining function 228 is then configured to obtain an indication for each of the further radar tracks whether a third video track of the video track and the radar track of the further radar tracks correspond. The third video track of the video tracks and the radar track of the further radar tracks correspond on condition that a similarity between the third video track of the video tracks and the radar track of the further radar tracks according to a similarity measure is above a threshold.

The second identifying function 229 is then configured to identify the third video track of the video tracks as not redundant on condition that the third one of the video tracks and no one of the radar track and the further radar tracks correspond.

In embodiments, the similarity measure is based on a similarity between positions of an object of a radar track and positions of an object of a video track.

In further embodiments, the video tracks further comprises speeds in relation to the respective objects detected in the sequence of video image frames, and the radar track further comprises speeds in relation to the object detected in the radar data. The similarity measure is then based on a similarity between positions and speeds of a radar track and positions and speeds of a video track.

The detailed description of the acts of the method 100 described in relation to FIGS. 1a and 1b hereinabove apply also for the corresponding functions of the image processing device 200. Furthermore, the optional additional features of the method 100 described in relation to FIGS. 1a and 1b hereinabove, when applicable, apply also to the image processing device 200.

A person skilled in the art realizes that the present invention is not limited to the embodiments described above. On the contrary, many modifications and variations are possible within the scope of the appended claims. Such modifications and variations can be understood and effected by a skilled person in practicing the claimed invention, from a study of the drawings, the disclosure, and the appended claims.

The invention claimed is:

1. A method for identifying redundant video tracks, the method performed by a device and comprising:
obtaining video tracks,
wherein the video tracks comprise positions and a classification in relation to respective objects detected in a sequence of video image frames captured of a scene during a time period;
obtaining a radar track,
wherein the radar track comprises positions and a classification in relation to an object detected in radar data captured for at least a part of the scene during the time period;
obtaining an indication for each video track of the video tracks whether the radar track and the video track of the video tracks correspond,
wherein the radar track and the video track of the video tracks correspond on condition that a similarity between the radar track and the video track of the video tracks according to a similarity measure is above a threshold, and
wherein the similarity measure is based on a similarity between positions of an object of a radar track and positions of an object of a video track;
identifying a second video track of the video tracks as redundant on condition that:
the radar track and a first video track of the video tracks correspond, and the classification associated with the radar track is the same as, is a subclass of, or is a superclass of the classification associated with the first video track of the video tracks; and
the radar track and the second video track of the video tracks correspond, and the classification associated with the radar track is not the same as, is not a subclass of, and is not a superclass of the classification associated with the second video track of the video tracks.

2. The method according to claim 1, further comprising:
obtaining further radar tracks,
wherein the further radar tracks comprise positions and a classification in relation to respective further objects detected in the radar data captured for at least a part of the scene during the time period; and
obtaining an indication for each of the further radar tracks whether the second video track of the video track and the radar track of the further radar tracks correspond,
wherein the second video track of the video tracks and the radar track of the further radar tracks correspond on condition that a similarity between the second video track of the video tracks and the radar track of the further radar tracks according to a similarity measure is above a threshold, and
wherein the second video track of the video tracks is identified as redundant on the further condition that:
the second video track of the video tracks and no one of the further radar tracks correspond.

3. The method according to claim 1, further comprising:
obtaining further radar tracks,
wherein the further radar tracks comprise positions and a classification in relation to respective further objects detected in the radar data captured for at least a part of the scene during the time period;
obtaining an indication for each of the further radar tracks whether a third video track of the video tracks and the radar track of the further radar tracks correspond,
wherein the third video track of the video tracks and the radar track of the further radar tracks correspond on condition that a similarity between the third video track of the video tracks and the radar track of the further radar tracks according to a similarity measure is above a threshold; and
identifying the third video track of the video tracks as not redundant on condition that;
the third one of the video tracks and no one of the radar track and the further radar tracks correspond.

4. The method according to claim 1, wherein the video tracks further comprise speeds in relation to the respective objects detected in the sequence of video image frames, and the radar track further comprises speeds in relation to the object detected in the radar data.

5. The method according to claim 4, wherein the similarity measure is based on a similarity between positions and speeds of a radar track and positions and speeds of a video track.

6. A non-transitory computer-readable storage medium storing instructions which, when executed in a device having a processing capability, causes the device to perform the method according to claim 1.

7. A device for identifying redundant video tracks, the device comprising:
circuitry configured to:
obtain video tracks,
wherein the video tracks comprises positions and a classification in relation to respective objects detected in a sequence of video image frames captured of a scene during a time period;
obtain a radar track,
wherein the radar track comprises positions and a classification in relation to an object detected in radar data captured for at least a part of the scene during the time period;
obtain an indication for each video track of the video tracks whether the radar track and the video track of the video tracks correspond,
wherein the radar track and the video track of the video tracks correspond on condition that a similarity between the radar track and the video track of the video tracks according to a similarity measure is above a threshold, and wherein the similarity measure is based on a similarity between positions of an object of a radar track and positions of an object of a video track;

identify a second video track of the video tracks as redundant on condition that:

the radar track and a first video track of the video tracks correspond, and the classification associated with the radar track is the same as, is a subclass of, or is a superclass of the classification associated with the first video track of the video tracks; and the radar track and the second video track of the video tracks correspond, and the classification associated with the radar track is not the same as, is not a subclass of, and is not a superclass of the second video track of the video tracks.

8. The device according to claim 7, wherein the circuitry is further configured to:

obtain further radar tracks, wherein the further radar tracks comprise positions and a classification in relation to respective further objects detected in the radar data; and obtain an indication for each of the further radar tracks whether the second video track of the video track and the radar track of the further radar tracks correspond, wherein the second video track of the video tracks and the radar track of the further radar tracks correspond on condition that a similarity between the second video track of the video tracks and the radar track of the further radar tracks according to a similarity measure is above a threshold, and wherein the second video track of the video tracks is-identified as redundant on the further condition that:

the second video track of the video tracks and no one of the further radar tracks correspond.

9. The device according to claim 7, wherein the circuitry is further configured to:

obtain further radar tracks, wherein the further radar tracks comprise positions and a classification in relation to respective further objects detected in the radar data;

obtain an indication for each of the further radar tracks whether a third video track of the video track and the radar track of the further radar tracks correspond, wherein the third video track of the video tracks and the radar track of the further radar tracks correspond on condition that a similarity between the third video track of the video tracks and the radar track of the further radar tracks according to a similarity measure is above a threshold;

identify the third video track of the video tracks as not redundant on condition that:

the third one of the video tracks and no one of the radar track and the further radar tracks correspond.

10. The device according to claim 7, wherein the video tracks further comprises speeds in relation to the respective objects detected in the sequence of video image frames, and the radar track further comprises speeds in relation to the object detected in the radar data.

11. The device according to claim 10, wherein the similarity measure is based on a similarity between positions and speeds of a radar track and positions and speeds of a video track.

* * * * *